2,789,138 d-N-METHYL-N-BENZYL-β-PHENYLISO-PROPYLAMINE

Richard V. Heinzelman, Kalamazoo Township, Kalamazoo County, and Brooke D. Aspergren, Kalamazoo, Mich., assignors to The Upjohn Company, Kalamazoo, Mich., a corporation of Michigan No Drawing. Application June 2, 1952,
Serial No. 291,296

3 Claims. (Cl. 260—570.9)

This invention relates to a novel dextro-rotating optically active amine and more particularly to d-N-methyl-N-benzyl-β-phenylisopropylamine represented by the following formula:

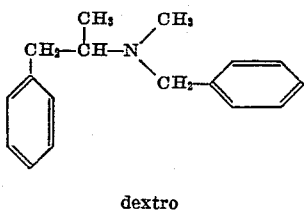

dextro and acid addition salts thereof.

It is an object of the present invention to provide the novel d-N-methyl-N-benzyl-β-phenylisopropylamine and acid addition salts thereof. Other objects of the present invention will be apparent to those skilled in the art to which this invention pertains.

The novel compounds of the present invention, d-N-methyl-N-benzyl-β-phenylisopropylamine and acid addition salts thereof, and especially the hydrochloric acid addition salt thereof, are useful physiologically active agents. More particularly, said compounds have been found to be unusually efficacious bronchodilators, i. e., agents capable of relaxing constricted bronchial musculature. Table I lists the results of tests performed on one of the novel compounds of the present invention and on compounds of similar structure known in the art. Quite unexpectedly, d - N-methyl-N-benzyl-β-phenylisopropylamine hydrochloride was far superior as a bronchodilator to any of the similar compounds known in the art. In fact, said novel compound was even far superior to the optically isomeric l-N-methyl-N-benzyl-β-phenylisopropylamine hydrochloride the preparation of which is given hereinafter.

The bronchodilator activity of the compounds listed in Table I was measured on isolated lungs of freshly killed rabbit, using pilocarpine, histamine, and acetylcholine as the broncho-constrictors, an accepted method of determining bronchodilator activity. The method use was essentially that of Sollman and Von Oettingen, Journal of the Proceedings of the Society for Experimental Biology and Medicine, 25, 692 (1928) and consists fundamentally of perfusing Locke's solution through the lung at a measured rate, the rate of flow being indicated by bubbles due to displacement of a liquid in a storage bottle. Bronchodilator effect is indicated by the increase in the number of bubbles per unit of time; the more bubbles per minute, the better the bronchodilation. The numbers below the constricting agents and opposite the various compounds are the increase in said number of bubbles and therefore are indicative of the efficacy of each compound in relieving the constriction caused by said agents, or in other words, the measurement of bronchodilator activity.

TABLE I

| Compound (hydrochloride) | Average number of bubbles increase per minute resulting from ½ and 1 cc. doses of 1:100 solutions when tested vs.— | | |
|---|---|---|---|
|  | Pilocarpine | Histamine | Acetylcholine |
| 1. dextro N - Methyl - N - benzyl - β - phenyliso - propylamine. | 32 (1:1000=5) | 22 (1:1000=11) | 30 (1:1000=16) |
| 2. levo N - Methyl - N - benzyl - β - phenylisopropylamine. | 9 | | |
| 3. N - Methyl - β - hydroxy - β - phenylisopropylamine (Ephedrine). | 2 | 4 | 16 |
| 4. N, N-Dimethyl-β-phenyl-n-propylamine [a]. | 4 | | |
| 5. N, N-Dimethyl-β-phenyl-isopropylamine [a]. | 13 | | |
| 6. N - Methyl - β - phenyl-isopropylamine [a]. | 2 | | |
| 7. N - Benzyl - β - phenyliso-propylamine [a]. | 9 | | |
| 8. N - Benzyl - β - phenyl-n-propylamine.[a] | 12 | | |

[a] Graham, Cartland, and Woodruff, Industrial and Engineering Chemistry, 37, 149 (1945).

d - N - methyl - N-benzyl-β-phenylisopropylamine is a colorless liquid, insoluble in water, and soluble in most of the common organic solvents such as, for example, methanol, ethanol, ether, chloroform, acetone, benzene, and others, and forms acid addition salts with most acids. Representative acid addition salts which may be prepared include the formate, acetate, butyrate, benzoate, succinate, salicylate, tartrate, hydrochloride, hydrobromide, hydroiodide, sulfate, and the like. A preferred procedure for the preparation of an acid addition salt involves the admixture of anhydrous organic solutions of the amine and the acid in approximately stoichiometric proportions, in which case the salt, which is usually insoluble in all except the more polar organic solvents, precipitates as soon as it is formed. Alternatively, stoichiometric proportions of the acid and amine may merely be admixed in a common solvent and the solid salt obtained by evaporation of the solvent present in the mixture. Other methods known in the art may also be employed for preparing acid addition salts of the novel amine base of the present invention.

When d-N-methyl-N-benzyl-β-phenylisopropylamine is to be employed as a therapeutic agent, an advantageous manner of oral administration is in the form of a stable acid addition salt thereof, particularly the hydrochloric acid addition salt thereof, a preferred acid addition salt.

d-N-methyl-N-benzyl-β-phenylisopropylamine may be prepared by adding benzyl chloride to d-desoxyephedrine hydrochloride (d-N-methyl-β-phenylisopropylamine hydrochloride) in the presence of finely powdered anhydrous sodium carbonate and in a non-reactive solvent such as, for example, benzene, toluene, xylene, or the like, or in the absence of a solvent, while heating and stirring the mixture at a temperature of between about room temperature and about 150 degrees centigrade over a period of from one to several hours. The isolation is conveniently accomplished by pouring the reaction mixture into water, extracting with benzene, removing the solvent, and fractionally distilling the residue to obtain the pure free amine. Other conventional methods of preparation, isolation, and purification, both of the free base and of salts thereof, are usually satisfactory.

The following examples are illustrative of the process and products of the present invention, but are not to be construed as limiting.

Example 1.—d-N-methyl-N-benzyl-β-phenylisopropylamine and its hydrochloric acid addition salt Fifty grams of $d$-desoxyephedrine hydrochloride was dissolved in a small amount of water and a molar excess of sodium hydroxide was added thereto. The resulting forty grams of precipitated oily $d$-desoxyephedrine was collected in ether and the whole was thereafter dried with anhydrous potassium carbonate. The ether was then removed, the resulting oily residue having an $n_D^{22}$ of 1.5045 was stirred in a flask with forty grams of anhydrous sodium carbonate at 120 degrees centigrade, and 34.6 grams of benzyl chloride was added dropwise thereto over a period of thirty minutes. Stirring was continued for two hours, whereafter the reaction mixture was extracted with benzene. The benzene was distilled from the extract and the residue of $d$-N-methyl-N-benzyl-β-phenylisopropylamine was distilled at reduced pressure. The thus-obtained free base, distilling at 127 degrees centigrade at a pressure of 0.2 millimeter of mercury and having an $n_D^{19}$ of 1.5515, was dissolved in ethyl acetate and a molar equivalent of ethanolic hydrogen chloride was added thereto. Anhydrous ether was added to the mixture and $d$-N-methyl-N-benzyl-β-phenylisopropylamine hydrochloride precipitated from the reaction mixture as an oil which was crystallized from ethyl acetate to give crystals melting at 129 to 130 degrees centigrade.

*Analysis.*—Percent calculated for $C_{17}H_{22}ClN$: C, 74.03; H, 8.04; N, 5.08. Found: C, 74.16; H, 7.80; N, 5.00.

Example 2.—l-N-methyl-N-benzyl-β-phenylisopropylamine and its hydrochloride acid addition salt In the same manner as given in Example 1, fifty grams (0.335 mole) of $l$-desoxyephedrine was reacted at 110 degrees centigrade with 42.5 grams (0.335 mole) of benzyl chloride, added dropwise, in the presence of 35 grams (0.33 mole) of finely ground anhydrous sodium carbonate. Heating was continued for one hour whereafter the whole was extracted with benzene. The benzene was distilled from the extract and the residue distilled to yield 53 grams, a yield of 65 percent of the theoretical, of $l$-N-methyl-N-benzyl-β-phenylisopropylamine, distilling at 155 to 156 degrees centigrade at a pressure of 0.9 millimeter of mercury. The free base was converted to $l$-N-methyl-N-benzyl-β-phenylisopropylamine hydrochloride by the addition of ethanolic hydrogen chloride to an ethyl acetate solution of the free base. The hydrochloride melted at 131 to 132 degrees centigrade after crystallization from ethyl acetate.

*Analysis.*—Percent calculated for $C_{17}H_{22}ClN$: C, 74.03; H, 8.04; N, 5.08; Cl, 12.86. Found: C, 73.94; H, 8.08; N, 5.33; Cl, 13.05.

In the same manner as described in Examples 1 and 2, other acid addition salts of the dextro and levo optically active isomers of N-methyl-N-benzyl-β-phenylisopropylamine are prepared by reacting the selected optical free base isomer in a solvent such as, for example, ethanol, methanol, ethyl acetate, ether, water, or the like, with an acid such as, for example, sulfuric, nitric, phosphoric, picric, citric, acetic, lactic, tartaric, glycolic, acetylsalicylic, nicotinic, succinic, hydrobromic, hydroiodic, or the like acid.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A compound substantially free from its optical isomer and selected from the group consisting of $d$-N-methyl-N-benzyl-β-phenylisopropylamine and acid addition salts thereof.

2. $d$-N-methyl-N-benzyl-β-phenylisopropylamine substantially free from the levo form.

3. $d$-N-methyl-N-benzyl-β-phenylisopropylamine hydrochloride substantially free from the levo form.

References Cited in the file of this patent
UNITED STATES PATENTS 2,006,114   Rosenmund et al. _____ June 25, 1935

OTHER REFERENCES

Gilman: Organic Chemistry, vol. 1, pp. 155, 159, 176 and 187–196 (1938).